United States Patent [19]

Lasis et al.

[11] 4,168,369
[45] Sep. 18, 1979

[54] ALDEHYDE MODIFIED POLYMERS

[75] Inventors: Evalds Lasis; Ernest J. Buckler, both of Sarnia, Canada

[73] Assignee: Polysar Limited, Sarnia, Canada

[21] Appl. No.: 484,273

[22] Filed: Jun. 28, 1974

[30] Foreign Application Priority Data

Nov. 8, 1973 [CA] Canada .................................. 185312

[51] Int. Cl.² ............................................ C08G 12/08
[52] U.S. Cl. .................................... 525/381; 525/382; 525/186; 528/246; 528/266
[58] Field of Search ................... 260/72, 72.5, 73, 879; 528/231, 246, 266

[56] References Cited
U.S. PATENT DOCUMENTS

| 2,976,264 | 3/1961 | Harvey et al. | 260/73 R |
| 3,023,191 | 2/1962 | Tegge et al. | 260/73 R |
| 3,215,669 | 11/1965 | Devlin et al. | 260/73 R |

Primary Examiner—J. Ziegler
Attorney, Agent, or Firm—Stevens, Davis, Miller & Mosher

[57] ABSTRACT

Synthetic elastomer compositions of high green strength comprise the reaction product of a rubbery polymer of a conjugated alkadiene having a small number of aldehyde groups attached to and randomly distributed along the polymer chain, and a polyamine having at least two non-tertiary amine groups. An example is a copolymer of styrene, butadiene and cinnamaldehyde (0.5 parts by weight) reacted with p-phenylene diamine, in an amount of 1 mole diamine per mole of cinnamaldehyde.

13 Claims, No Drawings

ALDEHYDE MODIFIED POLYMERS

This invention is directed to processable synthetic elastomer compositions and in particular to vulcanizable compositions having good processability and/or improved green strength.

Synthetic elastomers such as SBR (Styrene Butadiene Rubber) or IR (Isoprene Rubber) are deficient in green strength. When stretched to about 50% elongation and above, they flow unevenly and develop weak points. The characteristics associated with the strength of such elastomeric compounds are known as green strength. In consequence of the weaknesses of such elastomeric compounds, they show little resistance to stretching beyond about 50% elongation, a phenomenon known as necking. These phenomena seriously limit the utility of synthetic rubbers. In applications such as the production of radial tires, where unvulcanized rubber compounds must substantially retain their shape at deformations of up to about 200% elongation, conventional synthetic elastomers cannot be used alone; they must be blended with natural rubber in proportions of not more than about 50% of the total rubber content.

The object of this invention is to improve the green strength of synthetic elastomers. Another object is to provide a synthetic elastomer composition having improved green strength and good processability. Yet another object is to provide a process for the production of an elastomer composition having improved green strength.

In accordance with this invention, there is provided an elastomer composition having improved green strength and good processability which comprises the reaction product of a rubbery polymer of a conjugated alkadiene having a small number of aldehyde groups attached to and randomly distributed along the polymer chain and a polyamine having at least two non-tertiary amine groups.

The elastomeric polymers of conjugated alkadienes used in accordance with this invention are made by the copolymerization of a conjugated alkadiene containing 4 to 8 carbon atoms with a small amount of a copolymerizable unsaturated aldehyde. Representative examples of suitable alkadienes are butadiene-1,3; isoprene; piperylene; 2-ethylbutadiene-1,3; 2,3 dimethyl butadiene-1,3; and mixtures thereof. Not more than an equal weight of the alkadiene may be replaced by a copolymerizable monoolefinically unsaturated compound such as styrene, alphamethylstyrene, vinyl pyridine, acrylonitrile, methacrylonitrile, ethyl acrylate, methyl methacrylate or mixtures thereof. The copolymerizable aldehyde may be a vinylidene substituted aliphatic or aromatic aldehyde, e.g. acrolein, methacrolein, crotonaldehyde, sorbaldehyde, cinnamaldehyde, etc. The copolymerization is preferably carried out in an aqueous emulsion system, preferably at a pH of about 7-11 using a free radical initiator system. The aldehyde monomer may vary from about 0.05 parts to about 2 parts by weight per 100 parts of total monomers, although the preferred amount is between 0.1 and 0.5 parts. The resulting polymer has a bound aldehyde content of less than about 10 millimoles and preferably between about 0.5 and 5 millimoles/100 gram. The properties of such polymers are substantially similar to those of the aldehyde free polymer as shown in the following comparative experiment.

Comparative Experiment

Three 75/25 butadiene/styrene polymers were prepared using the same polymerization recipe except for varying amounts of cinnamaldehyde and were compounded using the black compound recipe shown in Example 1. The compounds were tested for green stress-strain properties using an Instron tester and the results were as follows:

| | | | |
|---|---|---|---|
| Cinnamaldehyde (parts) | nil | 0.4 | 0.8 |
| Mooney viscosity (M/L-4" at 100° C.) | 66 | 59 | 50 |
| Maximum tensile stress (kg/cm$^2$) | 4.8 | 4.7 | 4.4 |
| Elongation at maximum stress (%) | 60 | 60 | 55 |
| Tensile strength at break (kg/cm$^2$) | 3.4 | 3.1 | 3.0 |
| Elongation at break (%) | 280 | 250 | 220 |
| Slope of stress/strain curve between 100 and 200% elongation | neg. | neg. | neg. |

The above data show that both the aldehyde-containing polymers and the aldehyde-free polymer have comparable maximum tensile stress at a relatively low elongation of 55–60%, comparable elongation at break of 250±30%, tensile strength at break of about ⅔ of the maximum strength and a negative slope in the stress/strain curve between 100% and 200% elongation. They are nearly identical and equally deficient in green strength.

The second components of the composition of this invention is a polyamine having two or more non-tertiary amine groups and represented by the general formula:

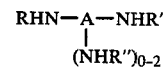

where R, R' and R" may be the same or different and are selected from hydrogen and hydrocarbyl radicals containing 1–8 carbon atoms and where A is a polyvalent hydrocarbyl radical or amino- or imino-hydrocarbyl radical containing less than about 100 carbon atoms. Polyamines having at least two primary amines separated by a radical containing 2–20 carbon atoms are preferred. Representative examples of such amines are diethylene triamine, dipropylene triamine, triethylene tetramine, tetraethylene pentamine, pentaethylene hexamine, poly(ethylenimine) or poly(propylenimine) each having a molecular weight of up to about 2000, paraphenylene diamine and diaryl substituted phenylene diamines, methylene dianiline and mixtures thereof. The preferred polyamines are non-volatile materials miscible with the solid elastomer. The polymer and polyamine may be mixed on a rubber mill or in an internal rubber mixer optionally in the presence of conventional rubber compounding ingredients, i.e. without significantly changing the compounding procedure for conventional synthetic rubbers. The temperature of mixing should be at least about 30° C. but not above about 150° C.; secondary polyamines usually require slightly higher temperatures. The amount of the polyamine may range within wide limits, although for best results and economy it should be controlled between 0.1, preferably about 0.5, and 5 moles per mole of aldehyde groups in the polymer.

It is desirable that both the synthetic elastomer and the polyamine be reasonably dry when interacted. It is not necessary that the two components be absolutely dry, in fact it is believed that the presence of water may be beneficial. The amount of water in the two components should not exceed the equivalent of about 10 moles of water per mole of amine group and preferably should not exceed 2 moles of water per mole of amine group.

The synthetic elastomer composition of this invention is a solid high molecular weight material similar to conventional synthetic rubbers in that it can be milled, extruded or otherwise processed with or without the conventional compounding ingredients, such as carbon black, plasticizers, extender oils, tackifiers, non-reinforcing fillers and vulcanizing agents, i.e. sulfur and accelerators. In contrast to conventional synthetic elastomers, the present composition is characterized by a high green strength and in this respect it is similar to natural rubber.

The term green strength refers to a property of an unvulcanized, i.e. green, elastomer compound of resisting deformation under moderate stress and maintaining that resistance at elongations up to about 100%. Elastomer compounds used for determining green strength contain the elastomers, carbon black and optionally, the other compounding ingredients including the curatives. Conventional methods are used to prepare such compounds. In this specification, the green strength is described by the set of seven parameters derived from the stress-strain curves, obtained at room temperature, of the elastomer compounds:

1. maximum tensile stress (modulus)
2. elongation at the maximum stress
3. tensile strength at break
4. elongation at break
5. 100% modulus
6. 200% modulus
7. Relative modulus change between 100% and 200% elongation.

The elastomer compound is considered to have satisfactory green strength when the stress strain curve shows either no maximum or only a very small maximum at elongations between 50 and 100%, when the relative change in modulus between 200% and 100% elongations is not less than about −10%, and when the elongation at break is at least 250%. It is preferred that the green elastomer compound show a stress strain curve maximum at greater than 100% elongation, most preferably at greater than 200% elongation, and that the relative change in modulus between 200% and 100% elongation be between about −5% and +15%. Natural rubber meets all these requirements. Conventional synthetic rubbers have a pronounced maximum in the stress strain curve at about 60% elongation, show a sharp drop in modulus between 100 and 200% elongation and frequently break at elongations of less than 250%.

Rheologically, the composition of this invention is about equivalent to or better than natural rubber and significantly better than the corresponding synthetic rubbers; it processes well in rubber processing equipment and maintains its strength when stretched to about 200% elongation. The mechanism of strengthening has not been established, although there is an indication that some associations or labile cross-links are formed between the aldehyde and amine groups.

The elastomeric composition of this invention is suitable for use in applications where natural rubber and general purpose synthetic rubbers are used, i.e. tires, footwear, hose, belting, molded and extruded goods. It may be used alone or in blends with natural rubber or conventional synthetic rubber. In particular, it can be used in applications where synthetic rubbers have not performed satisfactorily, i.e. in body skim of radial tires where high green strength compounds are required to prevent spreading of the body cords.

The present invention is further described in detail in the following examples.

EXAMPLE 1

Three SBR copolymers were prepared by polymerizing in a stirred 4-liter reactor a monomer mixture of 76.5 parts by weight of butadiene-1,3, 23 parts by weight of styrene and different amounts up to 0.5 parts of cinnamaldehyde, all emulsified in 180 parts of an aqueous solution of sodium salt of rosin acid. The polymerization was carried out at about 7° C. in the presence of paramenthene hydroperoxide and iron sulfoxylate as the redox initiator. The reaction was stopped at about 60% conversion, the latex stabilized with a phenolic antioxidant then stripped and coagulated and the coagulum dried in an oven at about 60° C. The dry rubber crumb was masticated on a laboratory mill to form a raw rubber sheet and small amounts of paraphenylene diamine (PPDA) were accurately admixed therewith. The characteristics of the sheets changed on the addition of PPDA as if the molecular weight had significantly increased.

200 gram samples of the copolymers treated with PPDA were then compounded on a mill using the following recipe, in grams:

| | |
|---|---|
| Copolymer | 200 |
| HAF (high abrasion furnace) black | 100 |
| Zinc oxide | 6.0 |
| Stearic acid | 2.0 |
| N-t-butyl-2-benzothiazole sulfenamide | 2.0 |
| Sulfur | 3.5 |

The compounds were tested using an Instron tester (Instron is a trademark) for stress-strain properties at room temperature and a jaw separation rate of 50 cm/min. and the results are presented in Table I.

TABLE I

| Compound | 1 | 2 | 3 |
|---|---|---|---|
| Copolymer No. | 1408B | 1408C | 1401-1 |
| Cinnamaldehyde (parts per 100 pts. monomer) | 0.2 | 0.4 | 0.5 |
| (millimoles/100 parts) | 1.5 | 3.0 | 3.8 |
| Mooney Viscosity (M/L-4' at 100° C.) | 79 | 71 | 37 |
| p-phenylene diamine (parts/100 pts. copolymer) | 0.2 | 0.2 | 0.4 |
| Ratio of diamine/cinnamaldehyde (mole/mole) | 1.2 | 0.6 | 1.0 |
| Stress-Strain Properties of Green Compounds | | | |
| Maximum tensile stress (kg/cm$^2$) | 11.5 | 27.4 | 6.6 |
| Elongation at max. tensile stress (%) | 600 | 680 | 600 |
| Tensile strength at break (kg/cm$^2$) | 11.0 | 27.4 | 6.3 |
| Elongation at break (%) | 750 | 680 | 730 |
| 100% modulus (kg/cm$^2$) | 7.4 | 8.5 | 3.2 |
| 200% modulus (kg/cm$^2$) | 7.8 | 11.5 | 3.6 |
| % change in modulus ($\frac{200\% M - 100\% M}{100\% M} \times 100$) | +5 | +35 | +12 |
| Milling properties | fair | poor | fair |

Compounds 1 to 3 behaved as though they were elastomers for extremely high molecular weight. Their tensile stress increased with increasing elongation and reached a maximum of up to 27 kg/cm² at about 600% elongation. Conventional synthetic rubbers such as SBR show a maximum tensile stress of up to about 5 kg/cm² at an elongation of about 60% (see comparative experiment hereinbefore). The processability of compounds 1–3 was fair to poor, as would be expected for high molecular weight elastomers, in spite of the reasonable molecular weights of the original elastomers.

EXAMPLE 2

A copolymer similar to those described in Example 1 except that it contained 0.13 parts of cinnamaldehyde (1 millimole/100 grams polymer) and had a Mooney viscosity (M/L-4' at 100° C.) of 95, was milled on a laboratory rubber mill to form a sheet. The sheet was divided into 4 portions and each portion was treated as in Example 1 with a different amount of paraphenylene diamine (PPDA) as shown in Table II. The treated portions were then compounded and tested for stress-strain properties as shown in Example 1. The results are presented in Table II.

TABLE II

| Compound 1408 | 1 (Control) | 2 | 3 | 4 |
|---|---|---|---|---|
| PPDA (parts by weight per 100 parts copolymer) | nil | 0.1 | 0.2 | 0.4 |
| Ratio of PPDA/cinnamaldehyde (mole/mole) | — | 1.0 | 1.9 | 3.7 |
| Stress-Strain Properties of Green Compounds | | | | |
| Maximum stress (kg/cm²) | 5.6 | 5.8 | 8.8 | 5.6 |
| Elongation at max. tensile (%) | 60 | 80 | 500 | 70 |
| Tensile at break (kg/cm²) | 3.5 | 5.6 | 8.4 | 4.5 |
| Elongation at break (%) | 420 | 460 | 650 | 420 |
| 100% modulus (kg/cm²) | 5.2 | 5.7 | 6.4 | 5.4 |
| 200% modulus (kg/cm²) | 4.6 | 5.4 | 6.8 | 5.0 |
| % change in modulus $\left(\frac{200\% M - 100\% M}{100\% M} \times 100\right)$ | −12 | −5 | +6 | −7 |

All the above compounds were as processable as the control butadiene-styrene copolymer (SBR) of comparable Mooney viscosity.

The table shows that Compound 3 had the highest green strength; it showed a tensile stress increasing up to 8.8 kg/cm² as the elongation increased up to 500%. Compound 2 showed only a very indistinct peak at 80% elongation, a moderate drop in modulus between 100 and 200% elongation but substantially no change on further stretching to 460%. The control sample showed that the modulus dropped by 12% between 100% and 200% elongation stress.

All the compounds were cured at 145° C. for 15 and 40 minutes and the vulcanizates were tested for stress-strain properties (using an Instron tester) in accordance with ASTM procedure D-412-64 and for hardness according to ASTM procedure D-2240-68. The results are presented in Table III. Stress strain and hardness properties are reported for both cure times, in the Table.

TABLE III

| Compound | 1 | 2 | 3 | 4 |
|---|---|---|---|---|
| Cure time (15 min/40 min.) | | | | |
| Tensile strength (kg/cm²) | 163/254 | 218/194 | 199/194 | 226/220 |
| Elongation at break (%) | 620/425 | 500/340 | 380/320 | 420/360 |
| 300% modulus (kg/cm²) | 58/156 | 104/161 | 140/181 | 143/171 |
| Hardness (Shore A-2) | 56/60 | 58/61 | 58/62 | 59/61 |

The above table shows that the polymers of this invention are readily vulcanizable and produce vulcanizates which, in comparison to the control compound (Compound 1), show higher modulus, lower elongation and higher hardness at both cure times and a higher tensile at the shorter cure time.

An additional compound similar to Compound 3 except that the amount of N-t-butyl-2-benzothiazole sulfenamide used was 1 gram per 200 grams of copolymer, was made and separated into two portions which were vulcanized at 145° for 25 and 50 minutes, respectively. The stress-strain and hardness properties were as follows:

| | 25 minute cure | 50 minute cure |
|---|---|---|
| Tensile strength (kg/cm²) | 90 | 170 |
| Elongation at break (%) | 560 | 430 |
| 300% modulus (kg/cm²) | 40 | 95 |
| Hardness (Shore A-2) | 52 | 53 |

This additional compound shows that the rate of vulcanization of the polymers of this invention can be adjusted by varying the amount of N-t-butyl-2-benzothiazole sulfenamide in the compound.

EXAMPLE 3

A copolymer of 76.8 parts of butadiene-1,3 23 parts of styrene and 0.2 parts of cinnamaldehyde prepared in an emulsion polymerization system at about 7° C. and having a Mooney viscosity (M/L-4' at 100° C.) of 92 was treated on a rubber mill with various amounts of different polyamines, then compounded using the recipe shown in Example 1. The compounds were tested for stress-strain properties as described in Example 1 and the results are shown in Table IV.

TABLE IV

| Compound | Polyamine** | Ratio polyamine/cinnamaldehyde (mole/mole) | Max. Tensile Stress (kg/cm²) | Tensile at Break (kg/cm²) | Elongation at max. (%) | Elongation at break (%) | 100% M (kg/cm²) | 200% M (kg/cm²) | Change in modulus (%)*** |
|---|---|---|---|---|---|---|---|---|---|
| 1 | — | control | 5.4 | 3.2 | 60 | 400 | 5.2 | 4.6 | −12 |
| 2 | DETA | 1.3 | 6.0 | 4.4 | 60 | 480 | 5.8 | 5.1 | −12 |
| 3 | TEPA | 1.5 | 7.0 | 5.8 | 60 | 580 | 6.8 | 6.7 | −1 |
| 4 | TEPA | 3.0 | 7.0 | 6.4 | 350 | 550 | 6.9 | 6.9 | 0 |
| 5 | TEPA + acid | 1.7 | 6.1 | 5.2 | 450 | 760 | 5.9 | 5.8 | −2 |
| 6 | PEHA | 2.4 | 6.7 | 5.7 | 70 | 670 | 6.6 | 6.6 | 0 |
| 7 | MDA | 0.7 | 6.8 | 6.5 | 450 | 600 | 5.7 | 6.0 | +5 |
| 8 | MDA | 1.3 | 6.9 | 6.5 | 500 | 640 | 5.5 | 5.9 | +7 |

TABLE IV-continued

| | | Ratio poly- | | Green Stress Strain Properties | | | | | |
|---|---|---|---|---|---|---|---|---|---|
| Com-pound | Poly-amine** | amine/cinna-maldehyde (mole/mole) | Max. Ten-sile Stress (kg/cm$^2$) | Tensile at Break (kg/cm$^2$) | Elonga-tion at max. (%) | Elonga-tion at break (%) | 100% M (kg/cm$^2$) | 200% M (kg/cm$^2$) | Change in modu-lus (%)*** |
| 9 | MDA | 2.7 | 5.6 | 4.8 | 60 | 560 | 5.2 | 5.2 | 0 |
| 10 | PEI-18 | 0.15 | 6.5 | 5.8 | 65 | 450 | 6.4 | 6.4 | 0 |
| 11 (Natural Rubber) | — | comparative | 4.5 | 4.5 | 580 | 580 | 2.5 | 2.6 | +4 |

**DETA - diethylene triamine was difficult to mix with rubber
TEPA - tetraethylene pentamine
TEPA + acid - tetraethylene pentamine and linoleic acid trimer in a molar ratio of 1:2
PEHA - pentaethylene hexamine
MDA - methylene dianiline
PEI-18 - poly(ethylenimine) MW - 1800, difficult to mix w/rubber

***Relative change in modulus: $\frac{200\% \text{ M} - 100\% \text{ M}}{100\% \text{ M}} \times 100$ Polyethylene polyamines were found to be effective agents for increasing green strength of the cinnamaldehyde containing copolymer. The low molecular weight member of the series, DETA, was difficult to mix with the rubber phase on the mill and the result was unsatisfactory. TEPA, a higher molecular weight member of the series, was better than DETA especially at a ratio of 3.0 moles/per mole of cinnamaldehyde and showed a maximum stress of 7.0 kg/cm$^2$ at 350% elongation. The compound maintained its strength up to the elongation at break of 550% showing no change in modulus between 100% and 200% elongation. Methylene dianiline was effective especially when used in amounts between 0.7 and 1.3 moles per mole of cinnamaldehyde.

EXAMPLE 4

Four unvulcanized compounds of the preceding Examples, including two controls, were subjected to 200% modulus relaxation test. In the test, a tensile test piece was stretched to and maintained at the 200% elongation. The stress was measured at 0 time and then at frequent intervals over a period of 6½ minutes. The results in Table V are expressed as a fraction of the initial stress.

TABLE V

| Compound No. | No. 1 of Ex 3 (control) | No. 4 of Ex 3 TEPA | No. 11 of Ex 3 (comparison)(NR) | No. 3 of Ex 2 PPDA |
|---|---|---|---|---|
| 200% Modulus (kg/cm$^2$) (original stress) | 4.6 | 6.9 | 2.6 | 6.8 |
| Stress at Time (seconds) | | | | |
| 15 | .515 | .609 | .624 | .606 |
| 30 | .435 | .548 | .570 | .546 |
| 90 | .340 | .468 | .493 | .468 |
| 150 | .305 | .438 | .461 | .435 |
| 390 | .248 | .382 | .415 | .385 |

Compound 1 of Example 3, being a control compound based on conventional synthetic rubber, showed a relatively fast decay of 200% stress; in 6½ minutes, the stress was reduced to about 25% of the original value. The natural rubber comparative compound and the compounds made in accordance with the process of this application retained about 40% of the initial stress in the same time. The slower relaxation and the higher initial stress value indicate that the compounds of this invention are considerably stronger than conventional synthetic rubber compounds and are practically equivalent to compounds of natural rubber.

EXAMPLE 5

Selected compounds of Example 3 were vulcanized at 145° C. for 25 and 50 minutes to produce vulcanizates for stress-strain property and hardness determination. The vulcanizates were tested in accordance with ASTM procedures D-412-64 and D-2240-68 and the results are presented in Table VI.

TABLE VI

| Compound No. | 1 (Control) | 4 (TEPA) | 7 (MDA) | 8 (MDA) |
|---|---|---|---|---|
| Cure Time 25/50 Minutes at 145° C. | | | | |
| Tensile Strength (kg/cm$^2$) | 248/268 | 246/265 | 214/245 | 254/249 |
| Elongation (%) | 540/450 | 550/500 | 550/450 | 470/410 |
| 300% Modulus (kg/cm$^2$) | 105/156 | 104/133 | 91/140 | 137/163 |
| Hardness (Shore A) | 63/63 | 62/64 | 55/61 | 61/62 |

Table VI shows that the vulcanization reaction and physical properties of the vulcanizates were essentially not affected by the treatment of aldehyde containing styrene-butadiene copolymers with polyamines such as TEPA (tetraethylene pentamine) or MDA (methylene dianiline).

EXAMPLE 6

A copolymer of 65 parts of isoprene, 35 parts of acrylonitrile and 0.5 part of cinnamaldehyde having a Mooney viscosity (M/L 4 at 100° C.) of about 50 was compounded on a two roll rubber mill using the following recipe, in parts by weight:

| Copolymer | 100 |
|---|---|
| HAF carbon black (high abrasion furnace) | 40 |
| Zinc oxide | 3.0 |
| Stearic acid | 0.5 |
| Benzothiazyl disulfide | 1.0 |
| Sulfur | 1.5 |

This was a control compound. A second compound was made under the same conditions and using the same recipe except for the addition of 0.5 parts of tetraethylene pentamine during milling.

Both compounds were tested for green strength as described in Example 1 and the results are presented in Table VII.

TABLE VII

|  | Control Compound | Compound with TEPA |
|---|---|---|
| Max. Tensile stress (kg/cm$^2$) | 5.7 | 6.9 |
| Elongation at max. % | 50 | 100 |
| Tensile strength at break | Would not break | |
| Elongation at break % | >1000 | >1000 |
| 100% modulus (kg/cm$^2$) | 5.2 | 6.9 |
| 200% modulus (kg/cm$^2$) | 3.8 | 6.2 |
| Change in modulus % | −27 | −10 |

The results show that the green strength properties of the copolymer have been improved by the addition of the tetraethylene pentamine.

EXAMPLE 7

A copolymer of 76.8 parts butadiene, 23 parts styrene and 0.2 parts cinnamaldehyde treated with 0.6 parts of tetraethylene pentamine (TEPA) was compared with a 77/23 butadiene/styrene copolymer for processability, green strength and vulcanizate properties using two recipes, one, a natural rubber containing carcass stock (Recipe A) and two, an unblended tread stock (Recipe B). Both copolymers were extended with 37.5 parts per 100 parts rubber of a naphthenic oil prior to compounding.

|  | Recipe A | Recipe B |
|---|---|---|
| Oil Ext. Copolymer | 55 | 137.5 |
| Natural Rubber | 60 | — |
| General purpose furnace black | 50 | 50 |
| Zinc oxide | 5 | 5 |
| Stearic acid | 1.5 | 1.5 |
| Naphthenic oil | 3 | — |
| Diaryl paraphenylene diamine | 1 | 1 |
| Thermoplastic hydrocarbon resin | 4 | 4 |
| N-oxy diethylene benzothiazole sulfenamide | 0.8 | 0.8 |
| Sulfur | 2.5 | 2.2 |

Standard rubber test methods were used. The results are presented in Table VIII.

TABLE VIII

| Recipe | A | | B | |
|---|---|---|---|---|
|  | 1 | | 2 | |
| Compound Polymer | Control SBR | ATA* Copolymer | Control SBR | ATA* Copolymer |
| Compound Mooney Viscosity (M/L 4' at 100° C.) | 22 | 25 | 38 | 38 |
| Mooney Scorch Time (mins. at 137.5° C.) | 15.5 | 12.6 | 25 | 24.3 |
| Green Stress Strain |  |  |  |  |
| Max. Tensile (kg/cm$^2$) | 2.3 | 2.3 | 2.6 | 2.5 |
| Elongation at max. % | 70 | 70 | 70 | 100 |
| Tensile at break (kg/cm$^2$) | 0.5 | 0.9 | 1.6 | 1.8 |
| Elongation at break % | 700 | 800 | 320 | 480 |
| 100% modulus (kg/cm$^2$) | 2.2 | 2.2 | 2.5 | 2.5 |
| 200% modulus (kg/cm$^2$) | 1.8 | 2.0 | 2.0 | 2.2 |
| $\frac{200\%M - 100\%M}{100\%M} \times 100\%$ (change in modulus) | −18 | −9 | −20 | −12 |
| Extrusion |  |  |  |  |
| Rate (cm/min) | 420 | 370 | 284 | 246 |
| Die swell (%) | 101 | 101 | 147 | 161 |
| Appearance | excellent | excellent | very good | good |
| Vulcanizate Properties |  |  |  |  |
| Cure time at 153° C. (min.) | 22 | 17 | 50 | 35 |
| Shore A-2 | 53 | 50 | 44 | 43 |
| 100% modulus (kg/cm$^2$) | 22.5 | 21.1 | 9.8 | 8.4 |
| 300% modulus (kg/cm$^2$) | 95 | 95.8 | 45.8 | 47.2 |
| Tensile strength (kg/cm$^2$) | 208 | 208 | 146 | 161 |
| Elongaton % | 550 | 540 | 700 | 740 |
| Rebound % | 64.7 | 66.2 | 62.7 | 62.2 |
| Heat build-up (°C.) | 16.7 | 16.7 | 22.8 | 23.9 |

*Amine treated aldehyde

The improvements in green strength can be seen for both recipes in the smaller change in modulus on going from 100% elongation to 200% elongation for the amine treated polymers. The processing characteristics of each compound are comparable with the control for each recipe and the vulcanizates show essentially equivalent properties. The amine treated polymers vulcanizes faster than the controls as evidenced by the shorter vulcanization times in both recipes.

EXAMPLE 8

The presence of a limited amount of water in either, or both of, the aldehyde containing polymer or in the amine is not detrimental to the improvement of green strength.

A portion of the butadiene-styrene-cinnamaldehyde polymer of Example 3 was dried under vacuum to a constant weight and essentially zero residual water. Tetraethylene pentamine was dried by passage over molecular sieves, a gas chromatographic analysis showing that it contained less than 1 mole percent of water. Compounds were prepared using the recipe of Example 1 and in which the quantities in parts by weight and shown in Table IX of tetraethylene pentamine and of water were added during the compounding. The green strength of the compounds was determined as before.

TABLE IX

| Experiment No. | Control | 1 | 2 | 3 |
|---|---|---|---|---|
| TEPA | 0.6 | 0.6 | 0.6 | 0.6 |
| Water | 0 | 0.06 | 0.12 | 0.23 |
| Green Stress-strain |  |  |  |  |
| Max. Tensile stress (kg/cm$^2$) | 6.7 | 7.7 | 6.75 | 6.40 |
| Elongation at max. (%) | 75 | 450 | 390 | 80 |
| Tensile strength at break (kg/cm$^2$) | 5.6 | 7.1 | 6.1 | 5.3 |
| Elongation at break (kg/cm$^2$) | 700 | 660 | 650 | 680 |
| 100% Modulus (kg/cm$^2$) | 6.6 | 6.8 | 6.5 | 6.35 |
| 200% Modulus (kg/cm$^2$) | 6.4 | 7.0 | 6.4 | 6.15 |
| Change in Modulus (%) | −3 | +3 | −1.5 | −3 |

In this example, the control is a polymer which has improved green strength caused by the incorporation of the amine and the experiments show that the addition of water is not detrimental to the improvement of green strength and may even improve further the green strength characteristics of the amine modified polymer.

What is claimed is:

1. A synthetic elastomer composition having improved green strength comprising the product of the reaction of a rubbery $C_4$-$C_8$ conjugated alkadiene polymer having per 100 grams of polymer not more than about 10 millimoles of aldehyde groups attached to and distributed along the polymer chain and a polyamine having at least two non-tertiary amine groups having the general formula

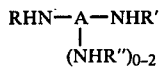

wherein R, R' and R" may be the same or different and are selected from hydrogen and hydrocarbyl radicals containing 1–8 carbon atoms and A is a polyvalent hydrocarbyl, iminohydrocarbyl or amino-hydrocarbyl radical containing less than about 100 carbon atoms, the amount of polyamine being from 0.1 to 5 moles per mole of aldehyde groups in the polymer.

2. The composition of claim 1 wherein the conjugated alkadiene polymer is a polymer of butadiene, isoprene or butadiene plus isoprene with a copolymerizable vinylidene substituted aliphatic or aromatic aldehyde.

3. The composition of claim 1 wherein the conjugated alkadiene polymer is a polymer of butadiene or isoprene with not more than an equal weight of a copolymerizable monoolefinically unsaturated compound selected from styrene, alphamethylstyrene, vinyl pyridine, acrylonitrile, methacrylonitrile, ethyl acrylate, methyl methacrylate or mixtures thereof, and with a copolymerizable vinylidene substituted aliphatic or aromatic aldehyde.

4. The composition of claim 3, wherein the vinylidene substituted aldehyde is selected from acrolein, methacrolein, croton aldehyde, sorbaldehyde or cinnamaldehyde.

5. The composition of claim 1 wherein the polyamine is selected from diethylene triamine, dipropylene triamine, triethylene tetramine, tetraethylene pentamine, pentaethylene hexamine, paraphenylene diamine, methylene dianiline, poly(ethylenimine) having a molecular weight of up to about 2,000, poly(propylenimine) having a molecular weight of up to about 2,000 and mixtures thereof.

6. The composition of claim 5 whenever compounded with fillers, plasticizers and vulcanizing agents and vulcanized.

7. The composition of claim 5 in which the amount of aldehyde groups is from 0.5 to 5 millimoles per 100 grams of polymer.

8. A process for producing an elastomer composition having improved green strength which comprises reacting a rubbery $C_4$–$C_8$ conjugated alkadiene polymer having per 100 grams of polymer not more than about 10 millimoles of aldehyde groups attached to and distributed along the polymer chain with a polyamine in an amount of from 0.1 to 5 moles per mole of aldehyde groups in the alkadiene polymer, said polyamine having at least two non-tertiary amine groups of the general formula

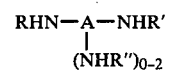

wherein R, R' and R" may be the same or different and are selected from hydrogen and hydrocarbyl radicals containing 1–8 carbon atoms and A is a polyvalent hydrocarbyl, imino-hydrocarbyl or amino-hydrocarbyl radical containing less than about 100 carbon atoms, said reaction being at a temperature of at least about 30° C. but not above about 150° C.

9. The process of claim 8 wherein said polymer and said polyamine are reacted on a rubber mill or in an internal rubber mixer.

10. The process of claim 9 in which the polymer and the polyamine are reacted in the presence of fillers, plasticizers and vulcanizing agents.

11. The process of claim 8 wherein said polymer and said polyamine contains not more than about 10 moles of water per mole of amine group.

12. The process of claim 11 in which the water is not more than about 2 moles per mole of amine group.

13. The process of claim 8 in which the polymer contains from 0.5 to 5 millimoles of aldehyde groups per 100 grams of polymer.

* * * * *